(12) United States Patent
Brüls et al.

(10) Patent No.: US 6,798,978 B1
(45) Date of Patent: Sep. 28, 2004

(54) METHOD OF AND DEVICE FOR ENCODING AN INFORMATION STREAM

(75) Inventors: Wilhelmus H. A. Brüls, Eindhoven (NL); Octavius J. Morris, Redhill (GB); Wiebe De Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/534,219

(22) Filed: Mar. 24, 2000

(30) Foreign Application Priority Data

Mar. 26, 1999 (EP) .............................................. 99200932

(51) Int. Cl.$^7$ ............................................... H04N 5/917
(52) U.S. Cl. ........................................ 386/112; 360/39
(58) Field of Search ........................... 386/27, 33, 109, 386/111, 112; 360/49, 39

(56) References Cited

U.S. PATENT DOCUMENTS

| | | | | |
|---|---|---|---|---|
| 5,594,598 A | * | 1/1997 | Shikakura | 386/109 |
| 5,790,745 A | * | 8/1998 | Sugiyama et al. | 386/111 |
| 5,901,149 A | * | 5/1999 | Itakura et al. | 386/109 |
| 6,219,043 B1 | * | 4/2001 | Yogeshwar et al. | 386/52 |

FOREIGN PATENT DOCUMENTS

| | | |
|---|---|---|
| EP | 0742674 A2 | 11/1996 |
| EP | 0802682 A1 | 10/1997 |

OTHER PUBLICATIONS

Daniele Bagnit et al, "Efficient Intra–Frame Encoding and Improved Rate Control in H.263 Compatible Format", Sep. 10, 1997, pp. 767–774, XP002095679.

Kondo S. et al, "One Pass Variable Bit Rate MPEG2 Video Coding Method for Digital Video Recording", Joint Magneto–Optical Recording Int'l Symposium and Int'l Symposium on Optical Memory (Moris/ISOM '97), Yamagata, Japan, Oct. 27–31, 1997, vol. 37, No. 4B, pp. 2231–2235, XP000885326.

Kondo S. et al: "A Real–Time Variable Bit Rate MPEG2 Video Coding Method for Digital Storage Media", IEEE Transactions on Consumer Electronics, US IEEE, Inc. NY, vol. 43 No. 3, Aug. 1, 1997, pp. 537–543, XP000742529, ISSN: 0098–3063.

Yokoyama Y. et al: "A Scene–Adaptive One–Pass Variable Bit Rate Video Coding Method for Storage Media", Proceedings 1999 Int'l Conf. on Image Processing (CAT. 99CH36348), Proceedings of $6^{T\ H}$ Int'l Conf. on Image Processing (ICIP '99), Kobe, Japan, Oct. 24–28, 1999, pp. 827–831, vol. 3, XP002143576, 1999, Piscataway, NJ, USA IEEE, USA ISBN: 0–7803–5467–2.

* cited by examiner

*Primary Examiner*—Thai Tran
*Assistant Examiner*—Christopher Onuaku
(74) *Attorney, Agent, or Firm*—Michael E. Belk

(57) ABSTRACT

An information stream is encoded into a variable bit rate encoded information stream. The relation is estimated between the variable bit rate, the recording time and the storage capacity of a record carrier. The deviation of the estimated recording time from the true recording time is kept within predefined limits and accumulation of deviations from several successive recordings is prevented.

15 Claims, 3 Drawing Sheets

METHOD OF AND DEVICE FOR ENCODING AN INFORMATION STREAM

The invention relates to a method of encoding an input information stream in one operation, which input information stream comprises a stream of information units [$I_{IN}$], comprising an encoding step of converting the input information stream into an output information stream, said output information stream comprising a variable stream of information units [$R_{ENC}$], the variable stream of information units being between a minimum value $R_{ENC,MIN}$ and a maximum value $R_{ENC,MAX}$, while the effect of the encoding step can be influenced by means of at least one control signal [R].

The invention also relates to an encoding device for encoding an input information stream comprising a steam of information units [$R_{IN}$] into an output information stream, said output information stream comprising a variable stream of information units [$R_{ENC}$] which is between a minimum value [$R_{ENC,MIN}$] and a maximum value [$R_{ENC,MAX}$].

The invention further relates to a recording device for recording an information stream on a record carrier, said device comprising recording means for recording an information stream on the record carrier.

Such a method, encoding device and recording device are known from European patent application EP 0 802 682 ("Video encoder and recording device", publication date 22-10-1997). This application discloses a system for encoding video information, in which the encoded information is recorded on a disc such as, for example, the digital video disc (DVD). To this end, the system comprises a compression unit having a variable output information stream (Variable Bit Rate, VBR). An example of such a compression unit is a unit operating in accordance with the MPEG2 method which is described, inter alia, in IEEE Transactions on Consumer Electronics, Vol. 41, No. 3, August 1995, pp. 504–509, "Video disc system using variable bit rate". The system, which is known from the above-mentioned application, is suitable for encoding the information stream in one operation. Due to the variable output information stream, rendering the quantity of storage space required for recording the video information unknown in advance, and the fixed quantity of storage space present on a disc, the compression unit is operated in the limited variable output information stream mode (constraint VBR). The variation of the output stream is dynamically limited in such a way that the quantity of storage space on a disc is sufficient for storing the desired quantity of video information. The variation of the output stream is limited by controlling quality-defining parameters of the compression unit such as, for example, the maximum value of the variable stream of information units [$R_{MAX}$], the minimum value of the variable stream of information units [$R_{MIN}$] and the quantization scale [QSC]. It is known that a compression unit with a variable output information stream yields a more efficient encoding at the same picture quality than a compression unit with a constant output information steam (Constant Bit Rate, CBR).

A problem in the known system is that there is no linear relation between the storage space on a disc, expressed in information units, and the quantity of information, expressed in length of time, which can be stored on the disc. This is very confusing to a user, because he does not know at any moment during recording how much storage capacity, expressed in length of time, is left. Moreover, it is confusing that, if a block of information having a given length of time is erased, information may be stored in the erased block whose -length of time significantly deviates from the length of time of the erased block comprising information.

It is an object of the invention to provide a method of encoding an information stream into a variable stream of information units, in which for a user a substantially linear relation appears to exist between the length of time of the encoded information stream and the storage space required for storing the encoded information stream.

According to the invention, this object is achieved by means of a method of encoding an input information stream, which is characterized in that the method comprises a measuring step in which, at any instant T, a quantity of information units [$ENC_{OUT}(T)$] generated in the encoding step, reduced by a chosen average value of the variable stream of information units in the output information stream [$R_{ENC,AVER}$] multiplied by the instant T, is recorded in accordance with the formula [$ENC_{OUT}(T)-R_{ENC,AVER}\cdot T$], and a comparison step in which the quantity of information units [$ENC_{OUT}(T)-R_{ENC,AVER}\cdot T$] recorded in the measuring step is compared with at least one criterion, and in which at least one signalizing signal [S] is generated, and a control step in which at least one control signal [R] is generated, in which the state of the control signal depends on the state of at least one of the signalizing signals [S] generated in the comparison step, and which control signal influences the effect of the encoding step.

At any instant T, the quantity of information units $ENC_{OUT}(T)$ generated in the encoding step is recorded. This quantity is reduced by a chosen average value of the variable stream of information units in the output information stream, $R_{ENC,AVER}$, multiplied by the time T. By means of these data, the variable stream (Variable Bit Rate) of information units generated in the encoding step and ranging between a minimum value $R_{ENC,MIN}$ and a maximum value $R_{ENC,MAX}$ can be represented at any instant T by a constant stream (Constant Bit Rate) of information units having a chosen value $R_{ENC,AVER}$ and a quantity of [$ENC_{OUT}(T)-R_{ENC,AVER}\cdot T$] information units which are stored in an imaginary buffer (referred to as virtual buffer). Due to the constant stream of information units, a linear relation can be established between the storage space on a disc, expressed in information units $D_{SIZE}$, and the quantity of information expressed in length of time $T_{DISC}$ that can be stored on the disc, namely $T_{DISC}=D_{SIZE}/R_{ENC,AVER}$. Since the stream of information units generated in the encoding step is actually a variable stream, $T_{DISC}$ is actually an approximation. The deviation of the approximated value of $T_{DISC}$ from the real value of $T_{DISC}$ is $(ENC_{OUT}(T)-R_{ENC,AVER}\cdot T)/R_{ENC,AVER}$.

In a comparison step, the quantity of information units stored in the virtual buffer is compared with at least one criterion, and at least one signalizing signal is generated, with the state of the signalizing signals being dependent on the result of the comparisons. Subsequently, control signals influencing the effect of the encoding step and hence the quantity of information units $ENC_{OUT}(T)$ generated in this encoding step are generated in dependence upon the signalizing signal. Via the mechanism of signalizing signals and control signals, the quantity of information units stored in the virtual buffer, and hence the deviation from the approximated value $T_{DISC}$ with respect to the real value of $T_{DISC}$ can be influenced.

The comparison step criteria may be fixed criteria which are always identical at the start of the method. However, it is alternatively possible to modify the criteria in dependence upon previous executions of the method. These so-called self-learning criteria do not always need to be identical at the start of the method.

An embodiment of the method according to the invention is characterized in that a first criterion is $-\alpha \cdot T_{VB} \cdot R_{ENC,AVER}$ and a second criterion is $\alpha \cdot T_{VB} \cdot R_{ENC,AVER}$, in which $T_{VB}$ represents a chosen time constant and in which $\alpha$ represents a constant chosen value, and in that a first signalizing signal $[S_{UNDER}]$ acquires a predetermined value if the equation $ENC_{OUT}(T) - [R_{ENC,AVER}] \cdot T \leq -\alpha \cdot T_{VB} \cdot R_{ENC,AVER}$ is true, and in that a second signalizing signal $[S_{OVER}]$ acquires a predetermined value if the equation $ENC_{OUT}(T) - R_{ENC,AVER} \cdot T \geq \alpha \cdot T_{VB} \cdot R_{ENC,AVER}$ is true, and in that at least one control signal influences the effect of the encoding step in such a way that the minimum value of the variable stream of information units in the output information stream $[R_{ENC,MIN}]$ will be equal to $R_{ENC,AVER}$ if the first signalizing signal $[S_{UNDER}]$ has the predetermined value, and in that at least one control signal influences the effect of the encoding step in such a way that the maximum value of the variable stream of information units in the output information stream $[R_{ENC,MAX}]$ will be equal to $R_{ENC,AVER}$ if the second signalizing signal $[S_{OVER}]$ has the predetermined value.

In this embodiment, the quantity of information units stored in the virtual buffer, $ENC_{OUT}(T) - R_{ENC,AVER} \cdot T$ is limited to a value between $-\alpha T_{VB} \cdot R_{ENC,AVER}$ and $\alpha \cdot T_{VB} \cdot R_{ENC,AVER}$. Consequently, the deviation of the approximated value of $T_{DISC}$ with respect to the real value of $T_{DISC}$ is limited to a value between $-\alpha \cdot T_{VB}$ and $\alpha \cdot T_{VB}$. By adapting the minimum value $R_{ENC,MIN}$ or the maximum value $R_{ENC,MAX}$ of the variable output information stream, it is prevented that the quantity of information units stored in the virtual buffer, $ENC_{OUT}(T) - R_{ENC,AVERT} \cdot T$ acquires a value outside the range between $-\alpha \cdot T_{VB} \cdot R_{ENC,AVER}$ and $\alpha \cdot T_{VB} \cdot R_{ENC,AVER}$.

An embodiment of the method according to the invention is characterized in that the chosen constant $\alpha$ has a value of 1.

In this embodiment, the chosen time constant $T_{VB}$ represents the maximum deviation of the approximated value of $T_{DISC}$ with respect to the real value of $T_{DISC}$.

An embodiment of the method according to the invention is characterized in that all states of the control signals [R] to be generated in the control step are laid down in elements of a table, and in that an element from the table is selected in dependence upon the state of at least one signalizing signal [S], and in that the state of the control signals laid down in the selected element is generated.

In a table, referred to as look-up table, with N elements, all states of the control signals to be generated in the control step are laid down in the elements of the look-up table. Per element, the states of the control signals are laid down for those control signals which occur simultaneously. A given control signal may be incorporated in a plurality of elements of the look-up table, in which case the fixed value of the control signal may deviate for each element.

Dependent on the state of at least one signalizing signal, a given element from the look-up table is selected. The control signals incorporated in the selected element subsequently acquire the values laid down in the selected element.

An embodiment of the method according to the invention is characterized in that the number of elements of the table is equal to $2 \cdot T_{VB} \cdot R_{ENC,AVER} + 1$.

If the number of elements N of the look-up table is equal to $2 \cdot T_{VB} \cdot R_{ENC,AVER} + 1$, and if the maximum deviation of the approximated value of $T_{DISC}$ with respect to the real value of $T_{DISC}$ does not become larger than the chosen time constant $T_{VB}$, then each value of the quantity of information units stored in the virtual buffer, $ENC_{OUT}(T) - R_{ENC,AVER} \cdot T$ may be assigned to an element of the look-up table via a signalizing signal which acquires the state M if the equation $ENC_{OUT}(T) - R_{ENC,AVER} \cdot T = M$ is true, in which M is an integer between $-T_{VB} \cdot R_{ENC,AVER}$ and $T_{VB} \cdot R_{ENC,AVER}$.

AN embodiment of the method according to the invention is characterized in that at least one signalizing signal [S] comprises a derivative of the quantity of information units $[ENC_{OUT}(T) - R_{ENC,AVER} \cdot T]$, recorded in the measuring step, as a function of time T.

The signalizing signal, generated in the comparison step, comprising the time derivative $(ENC_{OUT}(T) - R_{ENC,AVER} \cdot T)/T$ may signalize a trend in the quantity of information units stored in the virtual buffer, $ENC_{OUT}(T) - R_{ENC,AVER} \cdot T$. Subsequently, control signals, comprised in the signalizing signal, may be generated in dependence upon the signalized trend, which control signals influence the effect of the encoding step and hence the quantity of information units $ENC_{OUT}(T)$ generated in this encoding step.

An embodiment of the method according to the invention is characterized in that the quantity of information units $[ENC_{OUT}(T)]$ generated in the encoding step is assigned an initial value $ENC_{OUT}(0)$ at the start of the method.

If the method according to the invention is repeatedly performed on input information streams and if the associated output information streams are stored on the same record carrier such as a disc, then the total maximum deviation of the approximated value of $T_{DISC}$ with respect to the real value of $T_{DISC}$ will be an accumulation of the separate maximum deviations of the approximated value of $T_{DISC}$ with respect to the real value of $T_{DISC}$ for each execution of the method if the quantity of information units $[ENC_{OUT}(0)]$ is equal to 0 at the start of each execution of the method.

This accumulation of deviations may be prevented by assigning an initial value $ENC_{OUT}(0)$ at the start of the method to the quantity of information units $[ENC_{OUT}(T)]$ generated in the encoding step. If the assigned initial value $ENC_{OUT}(0)$ at the $i^{th}$ execution of the method, at which the output information stream is stored on a record carrier, is equal to the value $ENC_{OUT}(T) - R_{ENC,AVER} \cdot T$ upon termination of the $(i-1)^{th}$ execution of the method at which the output information stream is stored on the same record carrier, then there will be no accumulation of the deviation. Alternatively, the assigned initial value $ENC_{OUT}(0)$ upon the $i^{th}$ execution of the method may be a value derived from a value of $ENC_{OUT}(T) - R_{ENC,AVER} \cdot T$ upon termination of the $(i-1)^{th}$ execution of the method. This is the case, for example, if a part of the output information stream or the entire output information stream recorded on a record carrier at an earlier instant is erased or overwritten.

The initial value $ENC_{OUT}(0)$ to be assigned upon the $i^{th}$ execution of the method may also be distilled from a table of contents (TOC) of the record carrier or from the distribution on the record carrier of the information stored on the record carrier, with the output information stream associated with the previous $(i-1)^{th}$ executions of the method being stored on the record carrier.

An embodiment of the method according to the invention is characterized in that the value of the quantity of information units $[ENC_{OUT}(T) - R_{ENC,AVER} \cdot T]$ recorded in the measuring step is laid down.

The value of the quantity of information units $[ENC_{OUT}(T) - R_{ENC,AVER} \cdot T]$ recorded in the measuring step is laid down in such a way that this value may be used, for example, as an initial value $ENC_{OUT}(0)$ upon a subsequent execution of the method.

The value of the quantity of information units $[ENC_{OUT}(T) - R_{ENC,AVER} \cdot T]$ recorded in the measuring step may be laid down, for example, once upon termination of the method, or at more instants with regular intervals in between.

An embodiment of the method according to the invention is characterized in that, in the control step, at least one control signal is generated, the state of the control signal depending on an externally supplied indication signal which is typical of the contents of the input information stream.

An indication signal supplied externally, which is typical of the contents of the input information stream, controls the encoding step via at least one control signal. This control may be such that, for an input information stream comprising a given type or kind of information, the encoding step for this type of information proceeds optimally. The indication signal may be supplied, for example, manually or come from the same source as the input information stream.

It is another object of the invention to provide an encoding device making use of the method of encoding an information stream into a variable stream of information units, in which a substantially linear relation appears to exist for a user between the length of time of the encoded information stream and the storage space required for storing the encoded information stream.

This object is achieved by providing an encoding device for encoding an input information stream according to the invention, which is characterized in that the device comprises a compression unit, and means for recording the quantity of information units [$ENC_{OUT}(T)$] generated by the encoding device, means for determining the recorded quantity of information units [$ENC_{OUT}(T)$], reduced by a chosen average value of the variable stream of information units in the output information stream [$R_{ENC_AVER}$], multiplied by the instant T in accordance with the formula $ENC_{OUT}(T)-R_{ENC_AVER} \cdot T$, means for comparing the determined quantity of information units with at least one criterion, means for generating at least one signalizing signal, and means for generating at least one control signal.

An embodiment of the encoding device according to the invention is characterized in that the device is provided with means for inputting an initial value of the recorded quantity of information units [$ENC_{OUT}(0)$].

A further object of the invention is to provide a recording device for recording an information stream on a record carrier, which recording device makes use of the encoding device using the method of encoding an information stream into a variable stream of information units, in which a substantially linear relation appears to exist for a user between the length of time of the encoded information stream and the storage space required for storing the encoded information stream.

This object is achieved by providing a recording device for recording an information stream on a record carrier according to the invention, which is characterized in that the device comprises an encoding device according to the invention.

An embodiment of the recording device according to the invention is characterized in that the device is provided with means for recording the value of the determined quantity of information units $ENC_{OUT}(T)-R_{ENC_AVER} \cdot T$ on the record carrier.

These and other aspects of the invention are apparent from and will be elucidated with reference to the embodiment(s) described hereinafter.

In the drawings.

In these Figures, elements corresponding to elements already described are denoted by the same reference numerals.

Figure 1:
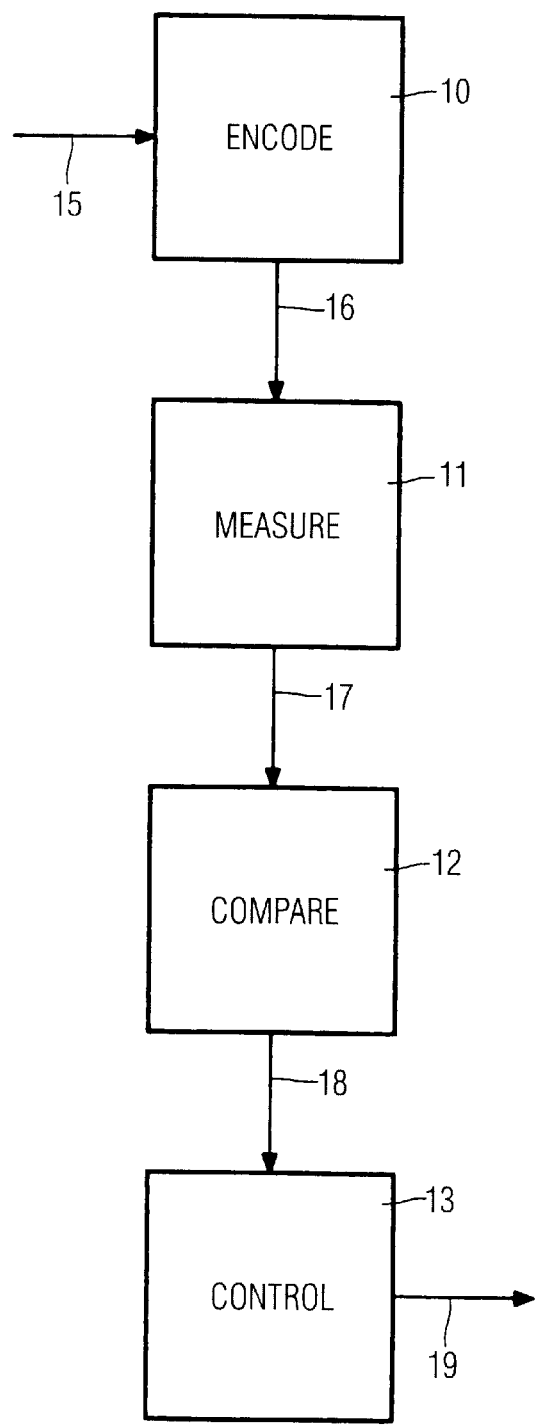
FIG. 1 shows a flow chart of a method according to the invention.

FIG. 1 shows a flow chart of a method according to the invention. In an encoding step 10, an input information stream 15 is converted into an output information stream 16. The quantity of information units, $ENC_{OUT}(T)$, in the output information stream 16 generated until the instant T in the encoding step 10 is recorded in a measuring step 11 and reduced by a chosen average value of the stream of information units, $R_{ENC_AVER}$, in the output information stream 16, multiplied by the instant T, which results in a value 17 of $ENC_{OUT}(T)-R_{ENC_AVER} \cdot T$. This value 17 is passed on to a comparison step 12. Upon the start of the method, an initial value, $ENC_{OUT}(0)$, may be assigned to the generated quantity of information units.

In the comparison step 12, the value 17 is compared with at least one criterion. Moreover, at least one signalizing signal 18 is generated in the comparison step 17. The state of one of the signalizing signals 18 may depend on the result of the comparison of the value 17 with at least one criterion. The signalizing signals 18 are passed on to a control step 13 in which control signals 19 are generated, with the state of the control signals depending on at least one of the signalizing signals 18. The control signals 19 may be used for influencing the effect of the encoding step 10.

Figure 2:
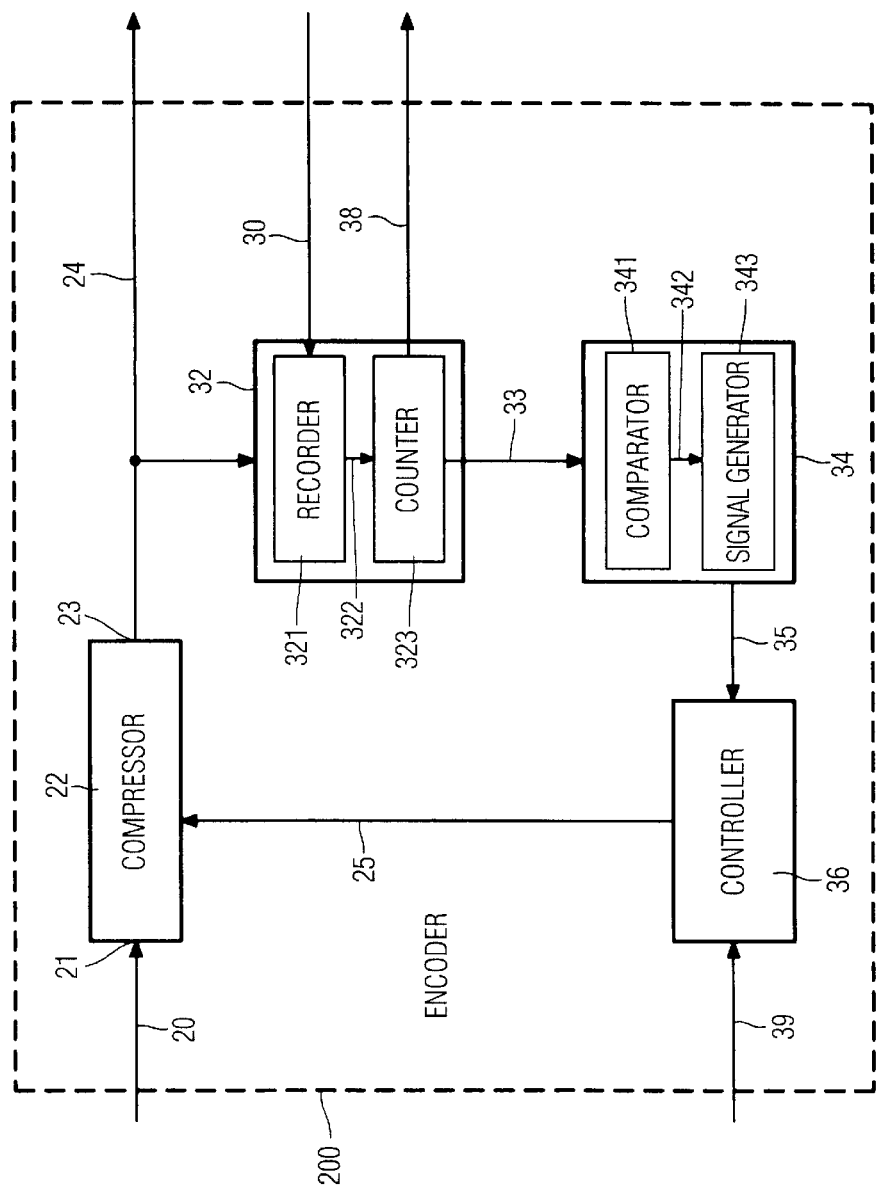
FIG. 2 is a block diagram of an encoding device according to the invention.

FIG. 2 is a block diagram of an encoding device 200 according to the invention. The encoding device 200 comprises a compression unit 22 which converts an input information stream 20 supplied via input 21 into an output information stream 24 at an output 23. The compression unit 22 is of a conventional type such as, for example, MPEG2 for video signals in accordance with ISO/IEC13818-2 or for audio signals in accordance with ISO-IEC13818-3. The output information stream 24 comprises a variable stream of information units (Variable Bit Rate, VBR), which variable stream is controllable via control signals 25.

A measuring block 32 comprises means 321 for recording the quantity of information units, $ENC_{OUT}(T)$, generated by the encoding device. Via signal 30, an initial value may be assigned to the quantity of information units, $ENC_{OUT}(0)$, generated by the encoding device. The recorded quantity of information units, $ENC_{OUT}(T)$, generated by the encoding device is passed on via a signal 322 to means 323, also present in measuring block 32, for determining the recorded quantity of information units [$ENC_{OUT}(T)$] at any instant T, reduced by a chosen average value of the variable stream of information units in the output information stream [$R_{ENC_AVER}$], multiplied by the instant T in accordance with the formula $ENC_{OUT}(T)-R_{ENC_AVER} \cdot T$.

The value of the quantity of information units $ENC_{OUT}(T)-R_{ENC_AVER} \cdot T$ determined in block 32 is passed on via a signal 33 to a comparison block 34. In this comparison block 34, the determined quantity of information units $ENC_{OUT}(T)-R_{ENC_AVER} \cdot T$ is compared by comparison means 341 with at least one criterion. At least one signalizing signal 35 is generated by means in block 343, with the state of the signalizing signals 35 being dependent, inter alia, via signal 342 on the result of the comparisons performed by the comparison means 341. At specific instants $T_X$, the value for the quantity of information units, $ENC_{OUT}(T)-R_{ENC_AVER} \cdot T_X$ determined in block 32 may become available via signal 38.

Block 36 comprises means for generating at least one control signal 25 such as, for example, $R_{MAX}$, $R_{MIN}$ and QSC, with the state of the control signals 25 being dependent on at least one of the signalizing signals 25. The state of the control signals 25 can be influenced via an indication signal 39 which is typical of the contents of the input information stream 20.

Figure 3:
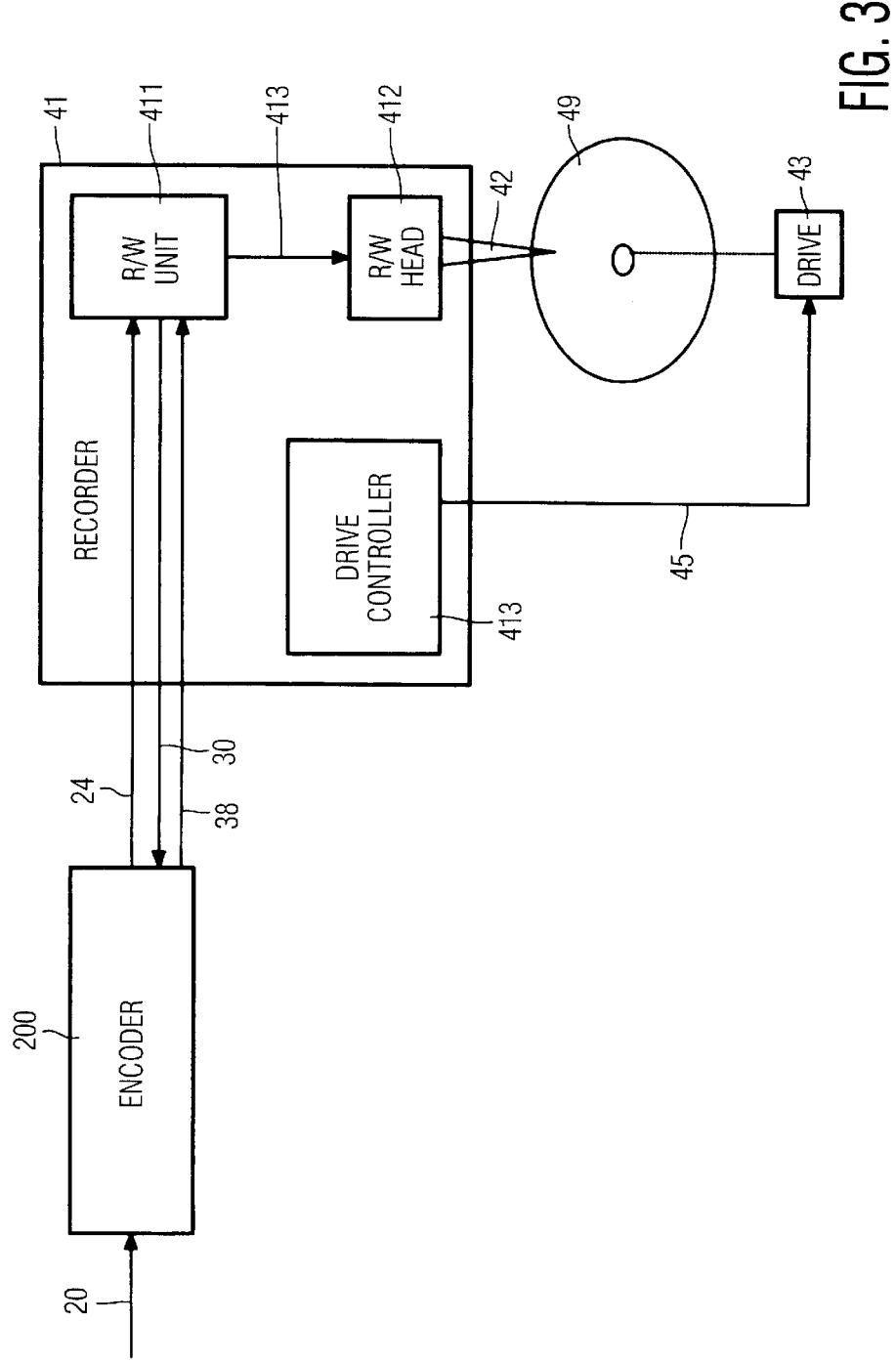
FIG. 3 is a block diagram of a recording device according to the invention.

FIG. 3 is a block diagram of a recording device according to the invention for writing information on a disc-shaped record carrier 49. The invention may be alternatively used for writable record carriers of a shape different from these disc-shaped record carriers, such as, for example, an optical or magnetic tape.

The recording device comprises an encoding device 200 according to the invention. The recording device also comprises a block with recording means 41 comprising a read/write unit 411, a read/write head 412 for, inter alia, writing information on the record carrier 49, and a system drive 413.

An input information stream 20 is converted by the encoding device into an output information stream 24, which stream is subsequently converted in the read/write unit 411 into a write signal 413. The write signal 413 is coupled to the read/write head 412. The record carrier 49 is rotatably driven by drive means 43 which are controlled by the system drive 413 via a signal 45. The read/write head 412 scans the record carrier 49 via a beam 42 and reads/writes patterns of marks therein, which marks represent information such as, for example, on a CD or a DVD.

The value for the quantity of information units $ENC_{OUT}(T_X) - R_{ENC,AVER} \cdot T_X$ determined in the encoding device 200 may be applied to the read/write unit 411 which subsequently converts signal 38 into a write signal 413. In this way, the value of the determined quantity of information units, $ENC_{OUT}(T_X) - R_{ENC,AVER} \cdot T_X$, can be laid down on the record carrier 49.

An initial value can be assigned via signal 30 to the quantity of information units, $ENC_{OUT}(0)$, generated by the encoding device 200. Signal 30 originates via read/write head 412 and read/write unit 411 from information which is present on the record carrier 49. This information may consist of a previously fixed, determined quantity of information units, $ENC_{OUT}(T_X) - R_{ENC,AVER} \cdot T_X$. The information may alternatively consist of information derived from a previously fixed, determined quantity of information units, $ENC_{OUT}(T_X) - R_{ENC,AVER} \cdot T_X$. This is the case, for example, if a part of or the entire output information stream 24 previously recorded on the record carrier 49 is erased or overwritten.

Alternatively, signal 30 may originate via read/write head 412 and read/write unit 411 from information which is present on the record carrier 49 and recorded in a table of contents on the record carrier.

What is claimed is:

1. A method of encoding an input information stream in one operation, comprising:

providing an input information stream including a stream of information units $R_{IN}$;

converting the input information stream into an output information stream, the output information stream including a variable stream of information units $R_{ENC}$, a value of the variable stream of information units being between a minimum value $R_{ENC,MIN}$ and a maximum value $R_{ENC,MAX}$, the effect of the converting step depends on at least one control signal R;

recording at any instant T, a quantity of information units $ENC_{OUT}(T)$ generated in the converting step, reduced by a chosen average value of the variable stream of information units in the output information stream $R_{ENC,AVER}$ multiplied by the instant T, in accordance with the formula ($ENC_{OUT}(T) - R_{ENC,AVER} \cdot T$);

comparing the quantity of information units ($ENC_{OUT}(T) - R_{ENC,AVER} \cdot T$) recorded in the recording step with at least one criterion; and generating at least one signalizing signal S; and controlling the converting by generating at least one control signal R, in which the state of the control signal depends on the state of at least one of the signalizing signals S generated in the comparing step.

2. The method of claim 1, in which:

a first criterion is $-\alpha \cdot T_{VB} \cdot R_{ENC,AVER}$ and a second criterion is $\alpha \cdot T_{VB} \cdot R_{ENC,AVER}$, in which $T_{VB}$ represents a chosen time constant and in which $\alpha$ represents a constant chosen value;

a first signalizing signal $S_{UNDER}$ acquires a predetermined value if the equation $$ENC_{OUT}(T) - R_{ENC,AVER} \cdot T \leq -\alpha \cdot T_{VB} \cdot R_{ENC,AVER}$$

is true;

a second signalizing signal $S_{OVER}$ acquires a predetermined value if the equation $$ENC_{OUT}(T) - R_{ENC,AVER} \cdot T \geq \alpha \cdot T_{VB} \cdot R_{ENC,AVER}$$

is true;

at least one control signal influences the effect of the converting step in such a way that the minimum value of the variable stream of information units in the output information stream $R_{ENC,MIN}$ will be equal to $R_{ENC,AVER}$ if the first signalizing signal $S_{UNDER}$ has the predetermined value; and at least one control signal influences the effect of the converting step in such a way that the maximum value of the variable stream of information units in the output information stream $R_{ENC,MAX}$ will be equal to $R_{ENC,AVER}$ if the second signalizing signal $S_{OVER}$ has the predetermined value.

3. The method of claim 2, in which the chosen constant $\alpha$ has a value of 1.

4. The method of claim 1, in which:

all states of the control signals R to be generated in the controlling step are laid down in elements of a table;

an element from the table is selected in dependence upon the state of at least one signalizing signal S; and the state of the control signals laid down in the selected element is generated.

5. The method of claim 4, in which the number of elements of the table is equal to $2 \cdot T_{VB} \cdot R_{ENC,AVER} + 1$.

6. The method of claim 1, in which at least one signalizing signal S includes a derivative of the quantity of information units ($ENC_{OUT}(T) - R_{ENC,AVER} \cdot T$), recorded in the recording step, as a function of time T.

7. The method of claim 1, in which the quantity of information units $ENC_{OUT}(T)$ generated in the converting step is assigned an initial value $ENC_{OUT}(0)$ at the start of the method.

8. The method of claim 1, in which the value of the quantity of information units ($ENC_{OUT}(T) - R_{ENC,AVER} \cdot T$) recorded in the recording step is laid down.

9. The method of claim 1, in which, in the controlling step, at least one control signal is generated, the state of the control signal depending on an externally supplied indication signal which is typical of the contents of the input information stream.

10. An encoding device, comprising:

means for encoding an input information stream, including a stream of information units $R_{IN}$ into an output information stream, the output information stream including a variable stream of information units $R_{ENC}$, a value of the variable stream of information units is between a minimum value $R_{ENC,MIN}$ and a maximum value $R_{ENC,MAX}$, the encoding depending on at least one control signal;

a compression unit;

means for recording the quantity of information units $ENC_{OUT}(T)$ generated by the encoding device;

means for determining the recorded quantity of information units $ENC_{OUT}(T)$, reduced by a chosen average value of the variable stream of information units in the output information stream $R_{ENC,AVER}$, multiplied by the instant T in accordance with the formula $ENC_{OUT}(T) - R_{ENC,AVER} \cdot T$;

means for comparing the determined quantity of information units with at least one criterion;

means for generating at least one signalizing signal depending on the comparing; and means for generating the at least one control signal depending on the signalizing signal.

11. The device of claim 10, the device further comprises means for inputting an initial value of the recorded quantity of information units $ENC_{OUT}(0)$.

12. A recording device comprising:

recording means for recording an information stream on the record carrier;

means for encoding an input information stream, including a stream of information units $R_{IN}$ into an output information stream, the output information stream including a variable stream of information units $R_{ENC}$, which variable stream of information units is between a minimum value $R_{ENC,MIN}$ and a maximum value $R_{ENC,MAX}$;

a compression unit;

means for recording the quantity of information units $ENC_{OUT}(T)$ generated by the encoding device;

means for determining the recorded quantity of information units $ENC_{OUT}(T)$, reduced by a chosen average value of the variable stream of information units in the output information stream $R_{ENC,AVER}$, multiplied by the instant T in accordance with the formula $ENC_{OUT}(T) - R_{ENC,AVER} \cdot T$;

means for comparing the determined quantity of information units with at least one criterion;

means for generating at least one signalizing signal; and means for generating at least one control signal.

13. The device of claim 12, in which the device further comprises means for recording the value of the determined quantity of information units $ENC_{OUT}(T) - R_{ENC,AVER} \cdot T$ on the record carrier.

14. The device of claim 12, in which the device further comprises means for inputting an initial value of the recorded quantity of information units $ENC_{OUT}(0)$.

15. The device of claim 14, in which the device further comprises means for recording the value of the determined quantity of information units $ENC_{OUT}(T) - R_{ENC,AVER} \cdot T$ on the record carrier.

* * * * *